March 13, 1962   E. KEZNICKL   3,024,714
CAMERA, MORE PARTICULARLY, MOTION PICTURE CAMERA
Filed Sept. 22, 1958

INVENTOR.
EDUARD KEZNICKL
BY
Otto John Munz
Atty.

United States Patent Office 3,024,714
Patented Mar. 13, 1962

3,024,714
CAMERA, MORE PARTICULARLY, MOTION PICTURE CAMERA
Eduard Keznickl, Vienna, Austria, assignor, by mesne assignments, to Ing. Alois Handler and Ing. Karl Vockenhuber, Vienna, Austria
Filed Sept. 22, 1958, Ser. No. 762,304
Claims priority, application Austria Oct. 3, 1957
3 Claims. (Cl. 95—44)

The present invention relates to cameras, both of the motion-picture and of the still-camera types, comprising supplementary objectives mounted on a movable carrier and a camera lens fixed in the camera.

In known cameras of this kind the focusing mechanism is provided in the supplementary objectives, the individual mounts of which carry the focusing scales. This arrangement is relatively complicated and expensive. In the cameras of the prior art having the basic lens formed as a complete objective, for use with or without a supplementary objective, focusing is rendered impossible when the camera lens alone is used.

It is an object of the invention to eliminate the disadvantages of the constructions of the prior art in a simple manner by providing the camera lens with a focusing mechanism, the focusing member of which moves an adjusting means, such as an index, and by providing the objective carrier with focusing scales, each of which cooperates with the adjusting index, and is associated with one of the objectives mounted on the carrier such that the adjusting index co-acts with the scale associated with that objective which is in operating position.

As a result of this arrangement the focus can be adjusted by means of a single focusing mechanism for all objective-camera lens combinations, and readings are automatically taken on the proper focusing scale, regardless of which objective is in operating position. As a consequence of this arrangement, any error of reading is eliminated and the camera is considerably simplified as compared with known constructions.

According to another object of the invention, a camera having a lens formed as a complete objective in itself, is provided with a focusing scale associated with an orifice in the objective lens turret, with or without a cooperating sunshield. The focusing scale cooperates with the focus adjusting index of the camera lens to indicate the focus setting of the camera lens alone.

In a camera with a revolving turret the focusing scales are advantageously arranged on the periphery of the body plate of the turret, while the adjusting index is provided on a focusing ring mounted coaxially with the camera lens.

In a preferred embodiment of the invention the part comprising the adjusting index for the various focusing scales itself is provided with depth of field markings which cooperate, as does the index, with the focusing scale of that objective which is in the operating position.

Other objects and features of the invention will become apparent to those skilled in the art as the disclosure is made in the following detailed description of a preferred embodiment of the invention as illustrated in the accompanying sheet of drawing in which.

Referring now to the drawings, wherein like reference characters designate like or corresponding parts throughout the several views, there is shown in FIGURE 1.

Figure 1:
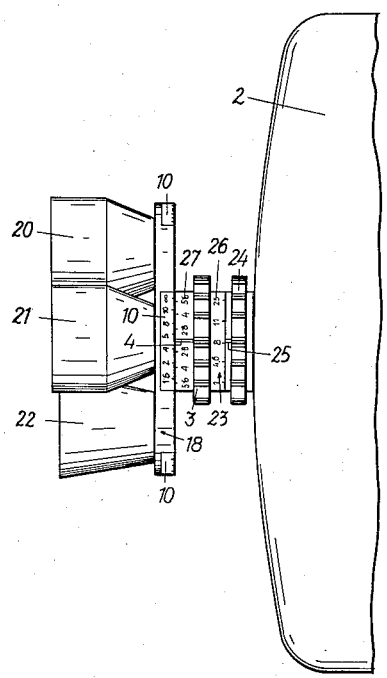
FIGURE 1 is a side view of a camera with supplementary objectives mounted on a common turret.
Figure 2:
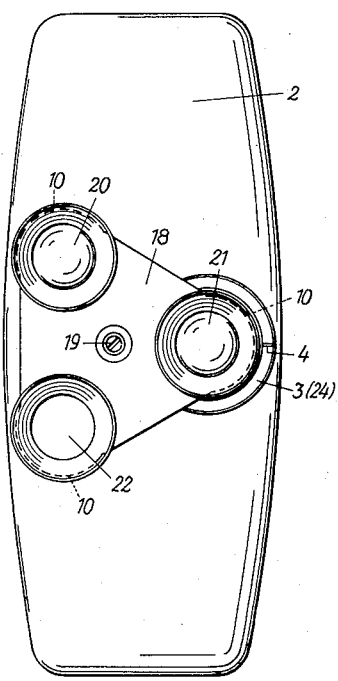
FIGURE 2 is a front view of the same arrangement.

Camera lens 23 of camera 2 having a focusing mechanism operated by the knurled focusing ring 3. A revolving turret 18 is provided on the front plate of the camera comprising, for instance, the telescopic objective 20 (e.g. 2 ×), a wide-angle objective 21 (e.g., 0.5 ×) and a sunshield for the camera lens 23 shown by 22. The pivot about which the turret revolves is shown at 19. Focusing scales 10 are arranged on the periphery of the carrying plate of the turret. When a selected objective, or the sunshield instead, is placed in operating position, the associated focusing scale 10 is correctly positioned to co-act with the index 4 fastened on ring 3. The depth of field scale 27 extends on both sides of the index 4, the individual graduations thereof indicating the corresponding values of lens aperture. The depth of field marking and the adjusting index are both common to the various focusing scales. The lens aperture is set by means of ring 24. The value of the lens aperture is indicated on a stationary diaphragm scale 26 by the index 25 fixed on the movable diaphragm ring 24.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

I claim:

1. A camera having a front plate member comprising a principal objective having a focusing mount arranged on said front plate member of the camera, a turret rotatably mounted on said camera, at least one auxiliary objective lens arranged on said turret, the turret having a free opening, the auxiliary objective lens and said opening being arrangeable individually by choice in front of the camera principal objective and coaxial therewith by rotatably moving the turret, the focusing mount of the camera objective having a rotatable focusing ring, said focusing ring carrying a focusing index, the turret having at least two focusing scales arranged thereon, the one corresponding to the camera principal objective alone and the other corresponding to the combined principal objective and the auxiliary objective, the focusing scales being angularly spaced on said turret and arranged in respective spaced positions for causing the first-mentioned scale to be disposed cooperatively with said focusing ring and index thereon when the free opening of the carrier is placed over the camera objective and to be moved away from said focusing ring and index when said free opening is rotatably moved out of coaxial alignment with said principal objective, and for causing said other focusing scale to be disposed cooperatively with the focusing ring and index when the corresponding auxiliary objective is placed in front of the camera principal objective and moved apart from said focusing ring and index as said turret auxiliary objective is rotated out of coaxial alignment with said principal objective, whereby each of said two focusing scales is positively rendered effective individually for focusing said camera by simply rotating said turret and placing the corresponding auxiliary objective or the free opening in coaxial alignment with said principal objective and each rendered positively ineffective as its corresponding auxiliary objective or free opening is rotated out of coaxial alignment with said principal objective.

2. In a camera having a front plate cover member, a principal objective having a principal optical axis and a single focusing index movable about said axis, a turret having a free opening and a plurality of auxiliary objective lenses, each of said auxiliary lenses having a respective discrete auxiliary optical axis, means mounting said turret on said camera for movement at will to dispose any selected auxiliary optical axis, or said free opening, into operative coincidence with said principal optical axis, the improvement which comprises a plurality of angularly spaced object-distance scales fixed for rotation with said turret, said scales corresponding to a respective one of said auxiliary objective lenses and to said free opening, one scale corresponding to the principal objectives and the others corresponding to the combined principal objective and the respective auxiliary objectives, said scales being disposed in respective spaced positions on said turret for movement into position individually cooperative with said focusing index by and in response to movement of said free opening or an individual auxiliary lens into coincidence with said principal optical axis, said scales being disposed in respective positions on said turret for causing said scales to be moved spaced apart from said index in response to turret movement for placing any given one of said auxiliary lenses or said opening out of coincidence with said principal optical axis, whereby the single movable index indicates on said scales individually and discretely the focus setting of the camera and each of said scales is positively rendered effective individually for focusing said camera by simply moving said turret and placing the corresponding auxiliary objective or said free opening into coincidence with said principal optical axis and each scale is rendered positively ineffective as its corresponding auxiliary objective or free opening is moved out of coincidence with said principal optical axis.

3. A camera including a front cover member and a principal objective lens mount having a principal optical axis, said objective lens mount including a ring rotatable about said principal optical axis and having a focusing index, a turret including a plurality of auxiliary objective lenses each having a discrete auxiliary optical axis and a free opening, means for pivotally mounting said turret to move the auxiliary axis of any selected one of said auxiliary lenses or said free opening into coincidence with said principal optical axis, and a plurality of object-distance scales carried by said turret angularly spaced thereon, each scale extending arcuately about a corresponding auxiliary axis and one scale extending arcuately about the axis of said free opening, said scales being disposed in respective spaced positions on said turret for movement into cooperative relation individually with said focusing index by and in response to pivotal movement of said turret to bring the corresponding auxiliary axis of a selected auxiliary lens or said free opening into coincidence with said principal optical axis.

References Cited in the file of this patent

UNITED STATES PATENTS

| | | |
|---|---|---|
| 2,027,411 | Whittaker | Jan. 14, 1936 |
| 2,184,018 | Ort | Dec. 19, 1939 |
| 2,263,024 | Wood | Nov. 18, 1941 |
| 2,319,083 | Nowak et al. | May 11, 1943 |
| 2,599,327 | Haesler | June 3, 1952 |
| 2,826,975 | Kiraly | Mar. 18, 1958 |
| 2,863,358 | Czarnikow | Dec. 9, 1958 |
| 2,878,734 | Colaiace | Mar. 24, 1959 |
| 2,897,739 | Gebele | Aug. 4, 1959 |
| 2,912,911 | Miller | Nov. 17, 1959 |
| 2,926,579 | Gebele | Mar. 1, 1960 |